(12) United States Patent
Parker et al.

(10) Patent No.: US 10,654,252 B2
(45) Date of Patent: May 19, 2020

(54) MULTI-LAYER ANTI-FOG COMPOSITIONS AND PROCESSES FOR MAKING SAME

(71) Applicant: CELANESE INTERNATIONAL CORPORATION, Irving, TX (US)

(72) Inventors: Kevin Parker, Hilton (GB); Joanna Marshall, Lichfield Staffs (GB)

(73) Assignee: CELANESE INTERNATIONAL CORPORATION, Irving, TX (US)

(*) Notice: Subject to any disclaimer, the term of this patent is extended or adjusted under 35 U.S.C. 154(b) by 296 days.

(21) Appl. No.: 15/598,855

(22) Filed: May 18, 2017

(65) Prior Publication Data

US 2018/0333940 A1   Nov. 22, 2018

(51) Int. Cl.

| | |
|---|---|
| *B32B 27/36* | (2006.01) |
| *B32B 27/22* | (2006.01) |
| *A42B 3/24* | (2006.01) |
| *B32B 23/20* | (2006.01) |
| *C08J 5/18* | (2006.01) |
| *C08K 5/521* | (2006.01) |
| *C08L 1/12* | (2006.01) |

(52) U.S. Cl.
CPC ............. *B32B 27/365* (2013.01); *A42B 3/24* (2013.01); *B32B 23/20* (2013.01); *B32B 27/22* (2013.01); *C08J 5/18* (2013.01); *C08K 5/521* (2013.01); *C08L 1/12* (2013.01); *B32B 2250/02* (2013.01); *B32B 2307/40* (2013.01); *C08J 2301/12* (2013.01)

(58) Field of Classification Search
CPC .... G02C 9/02; C08L 1/12; A42B 3/24; C08K 5/521; C08J 2301/12; C08J 5/18; B32B 2250/02; B32B 27/365; B32B 23/20; B32B 27/22; B32B 2307/40
See application file for complete search history.

(56) References Cited

U.S. PATENT DOCUMENTS

| | | | |
|---|---|---|---|
| 5,500,953 | A | 3/1996 | Reuber et al. |
| 5,806,102 | A | 9/1998 | Park |
| 2006/0010572 | A1 | 1/2006 | Douglas |
| 2015/0079381 | A1 | 3/2015 | Parker et al. |
| 2017/0009056 | A1 | 1/2017 | Parker et al. |

FOREIGN PATENT DOCUMENTS

| | | | | |
|---|---|---|---|---|
| EP | 2578098 A1 | 4/2013 | | |
| GB | 2284679 A | * | 6/1995 | ............. A61F 9/022 |
| WO | 2018075505 A1 | 4/2018 | | |

OTHER PUBLICATIONS

PCT/US2018/032667, "International Search Report and Written Opinion", dated Aug. 6, 2018, 11 pages.

* cited by examiner

*Primary Examiner* — Elizabeth C Imani
(74) *Attorney, Agent, or Firm* — Kilpatrick Townsend & Stockton LLP

(57) ABSTRACT

Multi-layer anti-fog compositions comprising an anti-fog layer and a protective layer. The anti-fog layer comprises cellulose acetate and a plasticizer and has opposing major planar surfaces. The protective layer has opposing major planar surfaces that are oriented substantially coplanar, at least in part, to the anti-fog layer that forms a multi-layered structure. The multi-layer anti-fog compositions further comprise one or more connectors, and at least one of the connectors extends through the multi-layered structure.

18 Claims, 1 Drawing Sheet

MULTI-LAYER ANTI-FOG COMPOSITIONS AND PROCESSES FOR MAKING SAME

FIELD OF THE INVENTION

The present invention relates generally to multi-layer anti-fog compositions and processes for making multi-layer anti-fog compositions. In particular, the present invention relates to a multi-layer anti-fog composition comprising a cellulose acetate anti-fog layer (having a low plasticizer migration) and a protective layer.

BACKGROUND OF THE INVENTION

Films are often applied to transparent substrates, such as lenses, goggles, helmets, and visors, in order to improve one or more physical properties of the transparent substrates. Multi-layer film compositions may be used in applications that require a combination of desired properties. For example, one layer may provide improved structure or durability while another layer may inhibit fogging. The combination of such layers results in compositions having improved strength/durability and anti-fogging characteristics.

Many fog resistant films are known. For example, polyurethane or silane coatings may be applied directly to substrates with no separation therebetween, with or without adhesive, to impart anti-fog properties, e.g., to prevent the formation of water droplets thereof. In use, however, such layers may separate from one another, creating performance and/or durability problems.

Other conventional anti-fog films utilize a one-piece construction. These fog resistant films may be formed by treating a cellulose acetate-containing substrate to impart anti-fog properties. The cellulose acetate substrate is typically formed by combining cellulose acetate and one or more specific plasticizers, e.g., phthalates such as diethyl phthalate.

The use of some plasticizers, however, often causes compatibility problems with the other layers of the multi-layer film composition and/or with structural features such as pins or connectors that extend through the layers in order to secure the orientation thereof relative to a housing, such as a motorcycle helmet. For example, where diethyl phthalate is the plasticizer and the pins or connectors (or potentially the protective layer) come into contact with the diethyl phthalate in the anti-fog layer, the diethyl phthalate may degrade the material of the pins or connectors that extend through the multi-layer composition. In some cases, the extension of the pins through the anti-fog layer causes the pins to contact the middle portion of the anti-fog film (where much of the plasticizer may be present). This contact results in plasticizer migration to the pins. In some cases, the plasticizer may even migrate into the other layers. This migration undesirably can lead to degradation causing brittleness and cracking as well as hazing or a lack of clarity. In some cases, other plasticizers, e.g., glycerol tribenzoate, benzyl benzoate, (acetyl) triethyl citrate, may contribute to significant haze problems, which detrimentally affect the clarity of the multi-layer film composition.

In view of the foregoing drawbacks, the need exists for a multi-layer film composition having protective and anti-fog properties, in which degradation, brittleness, and haziness resulting from plasticizer migration are eliminated or minimized.

SUMMARY OF THE INVENTION

In one embodiment, the disclosure relates to a multi-layer anti-fog composition comprising an anti-fog layer comprising cellulose acetate, e.g., from 60 wt % to 95 wt %, and a plasticizer, e.g., 5 to 40 wt. %, and a protective layer, preferably comprising polycarbonate, oriented substantially coplanar, at least in part, to the anti-fog layer so as to form the multi-layered anti-fog composition. The anti-fog layer and the protective layer each have opposing major planar surfaces. The anti-fog composition further comprises a connector extending through the multi-layered structure the connector preferably has the same composition as the protective layer. The configuration of the anti-fog layer and the protective layer may define an air gap therebetween. The plasticizer is preferably a haloalkyl phosphate, preferably a chloroalkyl phosphate. Examples include tris-chloroalkyl phosphates, e.g., tris-chloropropyl phosphate. The anti-fog layer may comprise less than 5 wt % of plasticizers selected from the group consisting of (acetyl) triethyl citrate, triacetin, triphenyl phosphate, diethyl phthalate, glycerol tribenzoate, polyethylene glycol, dimethyl sebacate, acetophenone, benzyl benzoate, N-ethyl-toluene sulfonamide, dibutyl citrate, diisoctyl adipate, phthalate esters, polyol esters, and mixtures thereof and/or may comprise substantially no cellulose acetate propionate and/or cellulose propionate. The anti-fog layer may comprise substantially no diethyl phthalate. The anti-fog layer may have a fog time greater than 10 seconds, preferably greater than 20 second, more preferably greater than 30 seconds and/or a haze value ranging from 0.1% to 4.0%, as measured by ASTM D1003 (2016 or equivalent). The composition preferably does not comprise an adhesive layer between the anti-fog film and the protective film. The plasticizer in the anti-fog composition may comprise tris-chloropropyl phosphate, the anti-fog layer has a fog time greater than 20 seconds and a haze value ranging from 0.1% to 3.0%. The plasticizer in the anti-fog composition may comprise tris-chloropropyl phosphate, the anti-fog layer has a fog time greater than 30 seconds and a haze value ranging from 0.1% to 2.5%.

In one embodiment, the disclosure relates to a process for producing a multi-layer anti-fog composition comprising an anti-fog layer, the process comprising the steps of combining cellulose acetate and a plasticizer comprising a haloalkyl phosphate and solvent to form a dope; casting the dope to form a precursor layer; contacting the precursor film with a caustic solution to form a treated layer, preferably at a residence time ranging from 0.5 minutes to 20 minutes and/or at a temperature ranging from 40° C. to 100° C.; washing the treated layer to form a washed layer; drying the washed layer to form the anti-fog layer; and attaching to the anti-fog layer a protective layer having opposing major planar surfaces using a connector to form a multi-layered structure. The protective layer is configured substantially coplanar, at least in part, to the anti-fog layer, and the connector extends through the multi-layered structure.

In one embodiment, the disclosure relates to a process for producing a multi-layer anti-fog composition comprising an anti-fog layer, the process comprising the steps of extruding pellets comprising cellulose acetate and a plasticizer comprising a haloalkyl phosphate and optionally an antioxidant and/or a heat stabilizer, to form a precursor layer contacting the precursor layer with a caustic solution to form a treated layer; washing the treated layer to form a washed layer; drying the washed layer to form the anti-fog layer; and attaching to the anti-fog layer a protective layer having opposing major planar surfaces using a connector to form a multi-layered structure. The protective layer is configured substantially coplanar, at least in part, to the anti-fog layer, and the connector extends through the multi-layered structure.

BRIEF DESCRIPTION OF DRAWINGS

The invention is described in detail below with reference to the appended drawings, wherein like numerals designate similar parts.

DETAILED DESCRIPTION OF THE INVENTION

Figure 1:
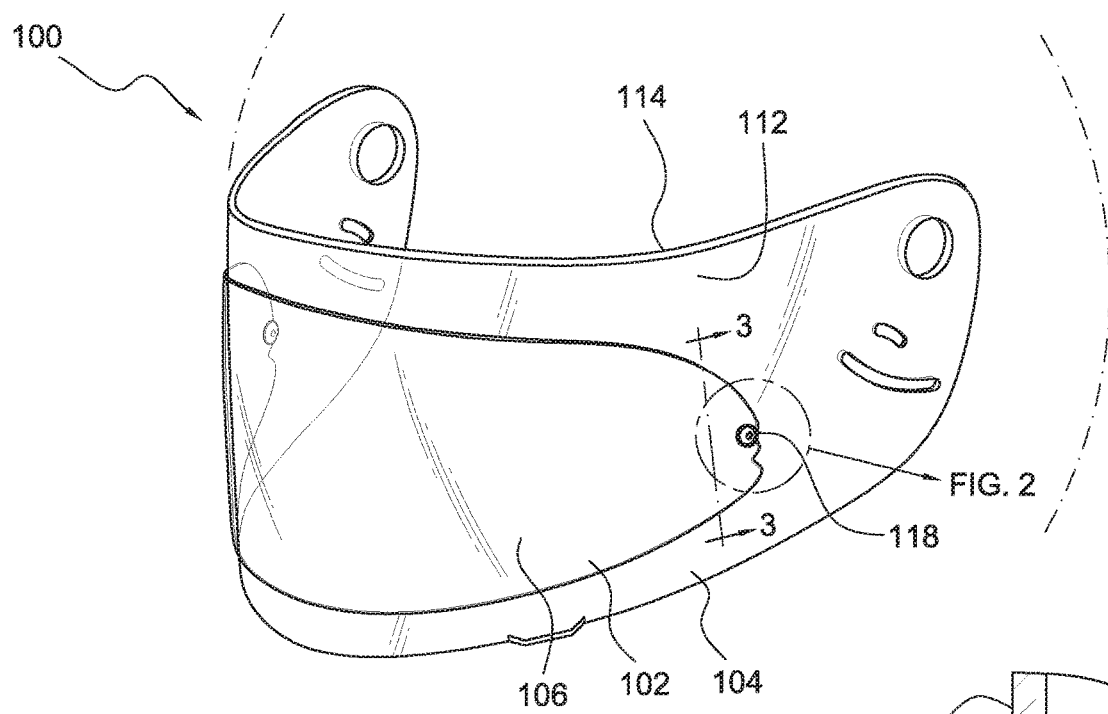
FIG. 1 shows a perspective view of one embodiment of a visor in accordance with present invention.

Multi-layer film compositions useful in protective lens applications (e.g., lenses, shields, goggles, and visors) often comprise a protective layer and a fog resistant (anti-fog) layer adhered or connected to a base substrate. It has now been discovered that when an air gap is defined between the anti-fog layer and the protective layer, the resultant multi-layer film compositions demonstrates a minimization or elimination of layer degradation, which may be caused by the plasticizer present in the anti-fog layer. It has also been discovered that the use of specific anti-fog formulations provides for anti-fog layers that minimize or eliminate the aforementioned degradation. In addition to the degradation-related improvements, the anti-fog layers of the present invention provide for improvements in clarity, e.g., reductions in haziness, brittleness, e.g., cracking, and saponification ability.

Multi-Layer Anti-Fog Composition

The multi-layer anti-fog composition of the present invention comprises an anti-fog layer and a protective layer. The anti-fog layer is formed from and/or comprises cellulose and a specific plasticizer, e.g., one or more specific plasticizers. The anti-fog layer and the protective layer each have respective opposing major planar surfaces. The major planar surfaces of the protective layer are configured or oriented substantially coplanar (at least in part) to the anti-fog layer. The protective layer and the anti-fog layer may be spaced from one another and the configuration thereof defines an air gap between the two layers. A connector, e.g., one or more connectors, may extend through the multi-layer structure, e.g., through the anti-fog layer, the air gap, and the protective layer, thus forming the multi-layer anti-fog composition. Without being bound by theory, it is believed that the air gap that is defined by the two layers provides at least a partial barrier to the plasticizer, as compared to a conventional configuration wherein there is actual contact between the anti-fog layer and the protective layer. The minimization of contact with the anti-fog layer minimizes (or eliminates) the detrimental effects of the plasticizer on the other components. In one embodiment, the invention relates to a multi-layer anti-fog composition comprising the anti-fog layer and the protective layer (comprising polycarbonate), as described above, wherein the anti-fog layer has a fog time greater than 10 seconds, and a haze value ranging from 0.1% to 4.0%, and wherein the protective layer has a haze value ranging from 0.1% to 4.0%.

Typically "haze value" or "haze" refers to haze value of a saponified film.

Also, in the present invention, the particular formulation of the anti-fog layer results in an anti-fog layer that is highly compatible with the protective layer and/or the connectors. In many anti-fog layer production processes, a precursor layer, e.g., the base film from which the actual anti-fog layer is formed, may be prepared by combining cellulose acetate and plasticizer, preferably by solvent casting a dope comprising the cellulose acetate, plasticizer, and solvent. The precursor layer is treated with a caustic solution, e.g., a basic solution such as a potassium hydroxide solution, under conditions effective to form the anti-fog layer that, in use, allows some moisture to seep into or absorb into the anti-fog layer (as opposed to allowing the water to pool atop the film). It has also been discovered that combinations of specific plasticizers and cellulose acetate, when utilized to form the anti-fog layer, provide for multi-layer anti-fog compositions that unexpectedly outperform conventional multi-layer compositions in terms of degradation. It is believed that because plasticizer degradation is mitigated, the clarity of the protective layer is also surprisingly improved. In addition, the inventive formulations have been found to improve the physical characteristics of the protective layer, e.g., haze, brittleness and cracking. In contrast, multi-layer compositions that utilize conventional plasticizer/cellulose acetate combinations in the anti-fog layer, e.g., those that employ diethyl phthalate, glycerin esters, and triphenyl phosphate: 1) cause plasticizer migration from the anti-fog layer, which leads to degradation of the other components of the multi-layer anti-fog composition; 2) lead to poor saponification, which has a detrimental effect on the resultant anti-fog properties; and/or 3) adversely affect the physical characteristics of the protective layer, e.g., haze, brittleness and cracking. It is noted that phthalate plasticizers, e.g., diethyl phthalate, are typically used in applications that employ cellulose acetate.

In one embodiment, the plasticizer comprises a haloalkyl phosphate, preferably, a chloroalkyl phosphate. In some embodiments, the plasticizer is a tris-chloroalkyl phosphate, e.g., tris-chloropropyl phosphate.

The anti-fog layer may comprise small amounts, if any, degrading plasticizers, e.g., phthalate plasticizers; glycerin ester plasticizers; and/or propylene carbonates. Specific examples include (acetyl) triethyl citrate, triacetin, triphenyl phosphate, diethyl phthalate, glycerol tribenzoate, polyethylene glycol, dimethyl sebacate, acetophenone, benzyl benzoate, N-ethyl-toluene sulfonamide, dibutyl citrate, diisooctyl adipate, phthalate esters, polyol esters, and mixtures thereof. For example, the anti-fog layer may comprise less than 5 wt % degrading plasticizers, e.g., less than 4 wt %, less than 3 wt %, less than 2 wt %, or less than 2 wt %. In some embodiments, the anti-fog layer comprises substantially no degrading plasticizers, e.g., substantially no degrading plasticizers. In particular, the anti-fog layer comprises substantially no degrading plasticizers, e.g., substantially no diethyl phthalate and/or glycerol tribenzoate.

In some embodiments, the anti-fog layer comprises less than 1 wt % cellulose acetate propionate and/or cellulose propionate, e.g., less than 0.5 wt %, less than 0.1 wt %, or less than 0.01 wt %.

In some cases, the multi-layer anti-fog composition comprises the anti-fog and protective layer spaced as mentioned herein. The anti-fog layer may have a fog time greater than 10 seconds and a haze value ranging from 0.1% to 4.0%, as measured by ASTM D1003 (2016 or equivalent), and the protective layer may have a haze value ranging from 0.1% to 4.0%, as measured by ASTM D1003 (2016 or equivalent). Additional ranges and limits are disclosed herein. The multi-layer anti-fog composition may include a connector extending through the anti-fog layer and the protective layer (to secure the orientation thereof).

In a preferred embodiment, the multi-layer anti-fog composition comprises from 60 wt % to 95 wt % cellulose acetate and from 5 to 40 wt % of plasticizer.

Anti-Fog Layer/Protective Layer

Without being bound by theory, the specific (caustic) treatment of the precursor layer modifies, e.g., reduces, the degree of acetyl substitution of the cellulose acetate increasing its anti-fog characteristics. When the specific caustic treatment is utilized to treat a precursor formed from the particular components discussed herein, a unique anti-fog composition having a highly desirable combination of performance characteristics is formed. Depending on the caustic treatment conditions, e.g., thickness of the precursor film and/or caustic treating time, the degree of substitution of the resulting anti-fog film may be substantially constant throughout the film or may increase from opposing major planar surfaces of the film toward a center coplanar region of the film. Modifying, e.g., reducing, the degree of substitution of the precursor film in this manner provides for increased hydrophilicity near the major planar surfaces of the anti-fog composition, allowing for increased water absorption and improved anti-fogging characteristics.

In one embodiment, the anti-fog layer has opposing major planar surfaces and a central coplanar region. The central coplanar region is disposed between the opposing major planar surfaces. In some embodiments, the cellulose acetate in the anti-fog layer has a degree of substitution that increases from the opposing major planar surfaces toward the central coplanar region. That is, the anti-fog layer may have a "decreasing degree of substitution gradient," e.g., a degree of substitution that is less at the outside planar surfaces of the anti-fog layer and increases toward the center coplanar region of the anti-fog layer. In one embodiment, the degree of substitution at one or more of the opposing major planar surfaces is less than 2.6, e.g., less than 2.55, less than 2.5, less than 2.0, less than 1.5, less than 1.0, or less than 0.5. In terms of lower limits, the degree of substitution at one or more of the opposing major planar surfaces may be at least 0.1, e.g., at least 0.2, at least 0.3, or at least 0.5. In one embodiment, the degree of substitution at one or more of the opposing major planar surfaces is substantially zero, e.g., from 0 to 0.5 or from 0 to 0.25. In terms of ranges, the degree of substitution at one or more of the opposing major planar surfaces may range from 0 to 2.6, e.g., from 0 to 2.55, from 0.1 to 2.5, from 0.2 to 2, or from 0.3 to 1.5. In some embodiments, the degree of substitution at the central coplanar region ranges from 2.0 to 2.6, e.g., from 2.0 to 2.55, from 2.1 to 2.55, from 2.2 to 2.55, or from 2.3 to 2.55. In terms of upper limits, the degree of substitution at the central coplanar region may be less than 2.6, e.g., less than 2.55, less than 2.5, less than 2.4, less than 2.3, or less than 2.2, but preferably at least 2.0, e.g., at least 2.1, or at least 2.3. The degree of substitution of the anti-fog layer affects the hydrophilicity of the precursor film and its ability to act as an anti-fog layer, with lower degrees of substitution corresponding to increased hydrophilicity. The increased hydrophilicity in turn allows for increased water absorption in the anti-fog layer, which beneficially provides for a longer lasting anti-fogging effect.

In some embodiments, the anti-fog layer has opposing major planar surfaces and a central coplanar region that is disposed between the opposing major planar surfaces, and the cellulose acetate in the anti-fog layer has a degree of substitution that is substantially uniform over the (cross sectional) thickness of the anti-fog composition, optionally varying by no more than 0.75, by no more than 0.5, or by no more than 0.25, throughout the thickness of the anti-fog layer. In some embodiments, the cellulose acetate in the anti-fog layer has a degree of substitution less than 2.6, e.g., less than 2.55, less than 2.5, less than 2.45, less than 2.3, less than 2.0, less than 1.75, less than 1.5, less than 1.0, less than 0.75, or less than 0.5. In terms of ranges, the degree of substitution of the cellulose acetate may range from 0 to 2.6, e.g., from 0 to 2.55, from 0 to 2.5, from 0.1 to 2.55, or from 0.1 to 1, between the opposing major planar surfaces. In one embodiment, the degree of substitution of the cellulose acetate at the central coplanar region is not greater than 10% different, e.g., not greater than 5% different, from the degree of substitution of at least one of the opposing major planar surfaces. Such anti-fog layer will have a low and substantially uniform degree of substitution, as compared to conventional films, e.g., films than have not been sufficiently treated. In one embodiment, the anti-fog layer may be produced by forming a precursor film, e.g., using the components discussed herein, and then treating the precursor film with a caustic solution. The precursor film may be treated with the caustic solution treatment for an extended period of time, as compared to conventional treatments, which may only last a few seconds. For example, the caustic solution treatment may be performed for at least 5 minutes, e.g., at least 7 minutes, at least 10 minutes, at least 12 minutes, at least 15 minutes, at least 17 minutes, or at least 20 minutes. Such anti-fog layer have the beneficial characteristics of improved anti-fogging characteristics and/or improved clarity, e.g., lack of haziness, as a result of the combination of the caustic treatment step and the specific precursor film composition.

The thickness of the precursor film may be a factor in the duration of the caustic solution treatment and the resulting characteristics of the anti-fog compositions. For example, a thinner film may require a shorter treatment time to achieve the desired anti-fog property than a thicker film.

The anti-fog layer, in some embodiments, does not comprise discrete layers, unlike some conventional anti-fog films that utilize a multi-layer construction comprising a base layer, e.g., a cellulose acetate layer, a polycarbonate layer, or a polyethylene terphthalate layer, and an anti-fog layer. As such, the present multi-layer compositions beneficially may avoid the problems associated with adherence of an anti-fog layer to a base layer, e.g., eventual separation of the layers during use.

The anti-fog layer, in one embodiment, comprises from 60 wt % to 95 wt % cellulose acetate, e.g., from 65 wt % to 90 wt %, from 70 wt % to 90 wt %, or from 75 wt % to 85 wt %. In terms of lower limits, the anti-fog layer may comprise at least 60 wt % cellulose acetate, e.g., at least 65 wt %, at least 70 wt % or at least 75 wt %. In terms of upper limits, the anti-fog layer may comprise less than 95 wt % cellulose acetate, e.g., less than 90 wt % or less than 85 wt %.

The anti-fog layer, in one embodiment, comprises from 5 wt % to 40 wt % plasticizer, e.g., from 5 wt % to 35 wt %, from 10 wt % to 30 wt %, or from 15 wt % to 25 wt %. In terms of lower limits, the anti-fog layer may comprise at least 60 wt % plasticizer, e.g., at least 5 wt %, at least 10 wt % or at least 15 wt %. In terms of upper limits, the anti-fog layer may comprise less than 95 wt % plasticizer, e.g., less than 40 wt %, less than 35 wt %, less than 30 wt %, or less than 25 wt %.

The composition of the protective layer may vary widely, and there are many compounds that are known to be useful in protective applications. In a preferred embodiment, the protective layer (and optionally the connector) comprises polycarbonate. The protective layer may, in some embodiments comprise acrylics, polyesters, and/or PMMA.

In one embodiment, the protective layer is made from an impact resistant plastic, such as polycarbonate. For indoor use, the protective layer may be transparent and for outdoor use or radiation protection, the protective layer may be tinted or coated to filter out unwanted radiation. In some cases, some or all of the protective layer may be perforated or vented to allow airflow.

The connector may vary widely. Preferably, the connector is a mechanical fastener, examples of which include (but are not limited to) pins, nails, screws, staples, etc. Such connectors are well known and are commercially available. In some embodiments, one or more pins extend through the anti-fog layer, through the air gap, and into the protective layer. Embodiments wherein the pin does not extend into both layers are contemplated. In some embodiments, the connector contacts both the anti-fog layer and the protective layer. In one embodiment, the composition does not comprise an adhesive layer between the anti-fog film and the protective film.

The dimensions of the anti-fog layer may vary widely. In one embodiment, the anti-fog layer has a thickness ranging from 25 microns to 2500 microns, e.g., from 50 microns to 2000 microns, from 100 microns to 2500 microns, from 100 microns to 2000 microns, from 100 microns to 1500 microns, from 300 microns to 1500 microns, from 350 microns to 1400 microns, from 400 microns to 1400 microns, from 450 microns to 1300 microns, from 600 microns to 1150 microns, from 700 microns to 1000 microns, or from 750 microns to 800 microns. In terms of lower limits, the thickness of the anti-fog layer may be greater than 25 microns, e.g., greater than 50 microns, greater than 100 microns, greater than 300 microns, greater than 400 microns, greater than 450 microns, greater than 600 microns, greater than 700 microns or greater than 750 microns. In terms of upper limits, the thickness of the anti-fog layer may be less than 2500 microns, e.g., less than 2000 microns, less than 1500 microns, less than 1400 microns, less than 1300 microns, less than 1150 microns, less than 1000 microns or less than 800 microns. Thicknesses may be measured via the methods known in the art, e.g., infrared scanning.

The dimensions of the protective layer may vary widely. In one embodiment, the protective layer has a thickness ranging from 25 microns to 10000 microns, e.g., from 25 microns to 5000 microns, from 100 microns to 5000 microns, from 500 microns to 4000 microns, from 600 microns to 3000 microns, or from 600 microns to 2000 microns. In terms of lower limits, the thickness of the anti-fog layer may be greater than 25 microns, e.g., greater than 50 microns, greater than 100 microns, greater than 500 microns or greater than 600 microns. In terms of upper limits, the thickness of the anti-fog layer may be less than 10000 microns, e.g., less than 5000 microns, less than 4000 microns, less than 3000 microns, or less than 2000 microns. Thicknesses may be measured via the methods mentioned herein.

Figure 2:
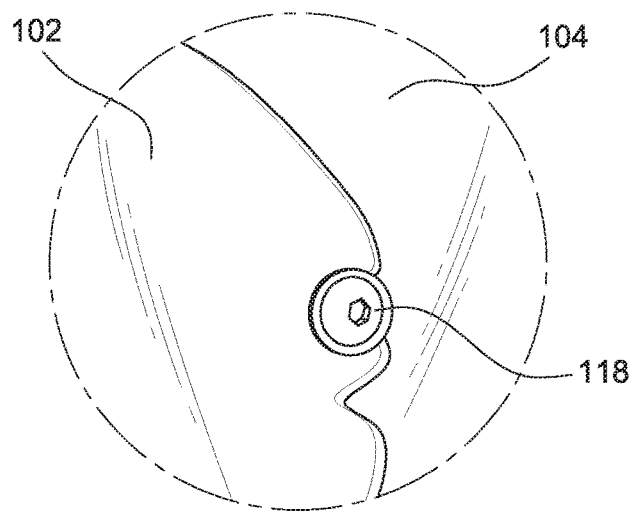
FIG. 2 shows an enlarged, partial view of the connector feature of the embodiment of FIG. 1.
Figure 3:
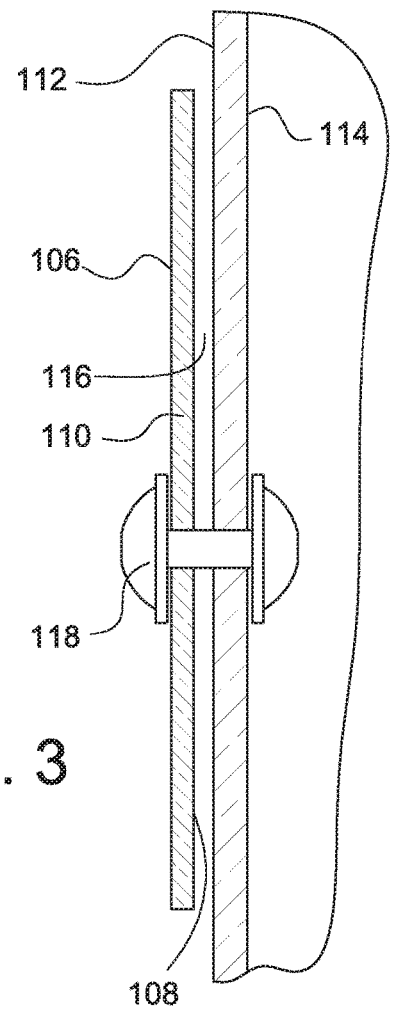
FIG. 3 shows a cross sectional view of the visor of FIG. 1 taken along the line 3-3 of FIG. 1

FIGS. 1-3 show embodiments of a multi-layer anti-fog composition in accordance with the present invention. In FIG. 1, multi-layer anti-fog composition 100 comprises anti-fog layer 102 and protective layer 104. Anti-fog layer 102 may have the composition described herein, e.g., may comprise cellulose acetate and a plasticizer, and may be produced as described herein. Protective layer 104 may have the composition described herein, e.g., may comprise polycarbonate, and may be produced as described herein. Anti-fog layer 102 has opposing major planar surfaces 106 and 108 (of FIG. 3). Anti-fog layer 102 has central coplanar region 110, which is disposed between opposing major planar surfaces 106 and 108. Protective layer 104 has opposing planar surfaces 112, 114. The opposing planar surfaces 112, 114 of protective layer 104 are configured or oriented substantially coplanar (at least in part) to anti-fog layer 102 thus forming a multi-layered structure. As shown in FIG. 3, protective layer 104 and anti-fog layer 102 are spaced from one another forming air gap 116 between the two layers 104, 102. Connector 118 extends through multi-layer structure 100, e.g., through anti-fog layer 102, air gap 116, and protective layer 104.

Performance Characteristics

The anti-fog layer, in some embodiments, has a fog time greater than 10 seconds, e.g., greater than 20 seconds, greater than 30 seconds, greater than 40 seconds, greater than 50 seconds, greater than 60 seconds, or greater than 70 seconds. In terms of ranges, the anti-fog layer may have a fog time ranging from 10 seconds to 150, e.g., from 20 seconds to 100 seconds or from 30 seconds to 90 seconds. In one embodiment, the fog time may be determined by placing an anti-fog film of the invention over a beaker of heated water, e.g., heated to approximately 50° C., and measuring the time taken for a fog to form, if any. The sample may be placed at a predetermined distance from the film, e.g., approximately 6 cm. In other cases, test methods EN166 and/or EN168.16 (2016 or equivalent) may be utilized to measure fog time.

As a result of the aforementioned anti-fog layer formulations, the haze value will also unexpectedly improve. In one embodiment, the anti-fog layer, has a haze value, e.g., an ASTM D1003 (2016 or equivalent) haze value, less than 4%, e.g., less than 3%, less than 2.5%, less than 2%, less than 1.5%, less than 1.2%, or less than 1%. In terms of ranges, the anti-fog layer may have a haze value ranging from 0.1% to 4%, e.g., from 0.1% to 3.5%, from 0.1% to 3%, 0.1% to 2%, from 0.2% to 3%, from 0.3% to 2.5%, or from 0.6% to 1%. In one embodiment, the haze may be measured by hazemeter. In one embodiment, haze may be measured with properly sized specimens having substantially plane-parallel surfaces, e.g., flat without wrinkling, free of dust, scratches, and particles, of about 0.85 mm in thickness using an UtraScan Pro analyzer from Hunter Labs with haze setting of D65/10. These haze value ranges and limits may also be applicable to the protective layer and/or to the anti-fog composition as a whole.

In one embodiment, the anti-fog is produced as discussed herein using the aforementioned components and saponification. The plasticizer in the anti-fog composition may comprise tris-chloropropyl phosphate, the anti-fog layer has a fog time greater than 20 seconds and a haze value ranging from 0.1% to 3.0%. In one embodiment, the plasticizer in the anti-fog composition may comprise tris-chloropropyl phosphate, the anti-fog layer has a fog time greater than 30 seconds and a haze value ranging from 0.1% to 2.5%.

In one embodiment, the anti-fog layer (and/or the protective layer) has haze Δ ranging from 0% to 10% as determined measuring haze before and after rubbing with a microfiber cloth under 1 pound of weight, e.g., from 0% to 5%, from 0% to 1%, or from 0% to 0.1%. In terms of lower limits, the anti-fog layer may have a haze Δ less than 10%, e.g., less than 5%, less than 1% or less than 0.1%.

In one embodiment, the anti-fog layer has a moisture (water) vapor transmission rate (MVTR) ranging from 5 $g/m^2$/day to 1000 $g/m^2$/day (at 25° C. and 75% relative humidity), e.g., from 100 $g/m^2$/day to 1000 $g/m^2$/day, from 200 $g/m^2$/day to 1000 $g/m^2$/day or from 250 $g/m^2$/day to 750 $g/m^2$/day. In terms of lower limits, the anti-fog composition may have a water vapor transmission rate greater than 100 g/m$^2$/day, e.g., greater than 200 g/m$^2$/day, or greater than 250 g/m$^2$/day. In terms of upper limits, the anti-fog composition may have a water vapor transmission rate less than 1000 g/m$^2$/day, e.g., less than 900 g/m$^2$/day, or less than 750 g/m$^2$/day. Water vapor transmission rate may be measured by gravimetric techniques. In one embodiment, the water vapor transmission rate is measured as noted in one of the following ASTM test standards (2016 or equivalent) ASTM F1249-06, ASTM E398-03, ASTM D1434, ASTM D3079, ASTM D4279, ASTM E96, ASTM E398, ASTM F1249, ASTM F2298, or ASTM F2622. In some cases, the MVTE will be dependent upon the thickness of the consumer product.

In one embodiment, the anti-fog layer has an impact strength (Charpy impact strength (notched)) ranging from 20 kj/m$^2$ to 60 kj/m$^2$, as measured by ISO 178, e.g., from 30 kj/m$^2$ to 50 kj/m$^2$. In terms of lower limits, the anti-fog composition may have an impact resistance greater than 20 kj/m$^2$, e.g., greater than 30 kj/m$^2$. In terms of upper limits, the anti-fog composition may have an impact resistance less than 60 kj/m$^2$, e.g., less than 50 kj/m$^2$.

In one embodiment, the protective layer demonstrates improvements in brittleness. Brittleness may be measured simply by ball bearing impact testing wherein a ball bearing impacts the test sample and the sample is observed for degree of shattering. In conventional applications, plasticizer migration will contribute to poor ball bearing impact testing.

The protective layer may have high impact strength, Charpy impact strength (notched). The ranges and limits for the impact strength of the protective layer may be similar to those ranges mentioned above for the anti-fog layer.

In one embodiment, the anti-fog layer has a transparency ranging from 40% to 100%, as measured by ASTM D1746 (2016 or equivalent) e.g., from 70% to 90%. In terms of lower limits, the anti-fog composition may have a transparency greater than 40%, e.g., greater than 70%. In terms of upper limits, the anti-fog composition may have a transparency less than 100%, e.g., less than 90%.

In one embodiment, the anti-fog layer has a light transmission greater than 80%, e.g., greater than 85%, greater than 90%, or greater than 95%, as measure by ISO EN 123117 (2016 or equivalent).

In one embodiment, the anti-fog layer has a light diffusion ranging from 0.1 cd/m$^2$/lx to 0.26 cd/m$^2$/lx as measured by EN 167 4 (2016 or equivalent) e.g., from 0.15 cd/m$^2$/lx to 0.25 cd/m$^2$/lx. In terms of lower limits, the anti-fog composition may have a light diffusion greater than 0.1 cd/m$^2$/lx, e.g., greater than 0.15 cd/m$^2$/lx. In terms of upper limits, the anti-fog composition may have a light diffusion less than 0.26 cd/m$^2$/lx e.g., less than 0.25 cd/m$^2$/lx.

In one embodiment, the anti-fog layer has a gloss ranging from 100 to 200 as measured by ASTM D5423 (2016 or equivalent) e.g., from 125 to 175, or from 145 to 155. In terms of lower limits, the anti-fog composition may have a light diffusion greater than 100, e.g., greater than 125 or greater than 145. In terms of upper limits, the anti-fog composition may have a light diffusion less than 200 e.g., less than 175 or less than 155.

In one embodiment, the anti-fog layer has a tensile strength ranging from 40 Nmm$^{-2}$ to 140 Nmm$^{-2}$, as measured by ASTM D882 (2016 or equivalent), e.g., from 70 Nmm$^{-2}$ to 110 Nmm$^{-2}$. In terms of lower limits, the anti-fog composition may have a tensile strength greater than 40 Nmm$^{-2}$, e.g., greater than 70 Nmm$^{-2}$. In terms of upper limits, the anti-fog composition may have a tensile strength less than 140 Nmm$^{-2}$, e.g., less than 90 Nmm$^{-2}$.

In one embodiment, the anti-fog layer has an elongation ranging from 20% to 60%, as measured by ASTM D882 (2016 or equivalent), e.g., from 25% to 55%. In terms of lower limits, the anti-fog composition may have an elongation greater than 20%, e.g., greater than 25%. In terms of upper limits, the anti-fog composition may have an elongation less than 60%, e.g., less than 55%.

In one embodiment, the anti-fog layer has a Young's modulus ranging from 1400 Nmm$^{-2}$ to 2400 Nmm$^{-2}$, as measured by ASTM D882, e.g., from 1600 Nmm$^{-2}$ to 2200 Nmm$^{-2}$, or from 1800 Nmm$^{-2}$ to 2000 Nmm$^{-2}$. In terms of lower limits, the anti-fog layer may have a Young's modulus greater than 1400 Nmm$^{-2}$, e.g., greater than 1600 Nmm$^{-2}$, or greater than 1800 Nmm$^{-2}$. In terms of upper limits, the anti-fog layer may have a Young's modulus less than 2400 Nmm$^{-2}$, e.g., less than 2200 Nmm$^{-2}$ or less than 2000 Nmm$^{-2}$.

The anti-fog layer, in some embodiments, has a scratch resistance less than 0.025 grams of weight loss after a set number of abrasion cycles, e.g., less than 0.020, less than 0.012, less than 0.010, less than 0.008, less than 0.006, less than 0.004, or less than 0.003. In terms of ranges, the anti-fog consumer product may have a scratch resistance ranging from 0 grams of weight loss to 0.025 grams of weight loss, e.g., from 0.00001 to 0.020, from 0.00001 to 0.010, or from 0.00005 to 0.008. The scratch resistance measurement may be determined via ASTM D4060 (2016 or equivalent) and the abrasion cycles may be performed using a Taber reciprocating abraser. For example, 2000, 1500, 1000, 500, or 200 abrasion cycles may be utilized.

In one embodiment, the anti-fog layer has a surface roughness less than 5 microns, e.g., less than 4.5 microns, less than 4 microns, less than 3 microns, less than 2.75 microns, or less than 2.7 microns. In terms of ranges, the anti-fog consumer product may have a surface roughness ranging from 0 to 5 microns, e.g., from 0.01 to 4.5 microns, from 0.5 to 4 microns, or from 0.5 to 3 microns. The surface roughness measurement may be determined by using a Mitutoyo Surftest surface roughness gauge, e.g., model SJ-210, SJ-310, or SJ-410.

The anti-fog layer, in some embodiments, has improved resistance to chemicals, e.g., chemicals in sunscreens, lotions, and/or insect repellants. In some cases, the anti-fog consumer product has a chemical resistance rating (as measured under Ford Laboratory Test Method BI 113-08 (2016 or equivalent)) less than 3, e.g., less than 2.5, less than 2, or less than 1.5. In terms of ranges, the anti-fog consumer product may have a chemical resistance ranging from 0 to 3, e.g., from 0.01 to 2.5, from 0.01 to 2, or from 0.01 to 1.5 microns. In one embodiment, the anti-fog consumer product shows no cloth impression. These chemical resistance ratings are further discussed herein. In one embodiment, the improved chemical resistance is related to chemicals selected from the group consisting of insect repellants, lotions, and/or sunscreens.

The above-mentioned test methods are incorporated by reference herein.

In one embodiment, the multi-layer anti-fog composition may be utilized in an eyewear application. The eyewear may comprise a lenses, and the lens may employ the multi-layer anti-fog composition. Exemplary eyewear includes glasses, goggles, and visors. In one embodiment, a helmet comprising such a visor is contemplated.

In one embodiment, the multi-layer anti-fog composition further comprises a protective film (different from the protective layer). The protective film may be adhered to at least one of the major planar surfaces (of the anti-fog layer or the protective layer). In some cases, the protective film may be adhered to only one major planar surface. The protective film may be a fairly low tack film that protects the multi-layer anti-fog composition, e.g., the surface thereof, from damage, e.g., physical, light-related, or chemical damage. In use, the protective film may be peeled away from the multi-layer anti-fog composition, optionally after application to a suitable substrate. The specific composition of the protective film may vary widely. In some embodiments, the protective film comprises a protective material selected from polyesters, polyethylenes, and polyethylene terephthalate. The protective film may be adhered to at least one of the major planar surfaces with a suitable adhesive, e.g., an acrylic polymer.

In some cases, the multi-layer anti-fog composition comprises an adhesive layer attached to one major planar surface. In one embodiment, the multi-layer anti-fog composition comprises an adhesive layer adhered to one major planar surface and a protective film attached, e.g., adhered, to the other major planar surface. The adhesive layer may then have a release film attached thereto. The multi-layer anti-fog composition may be in the form of a flat sheet or rolled sheet.

In one embodiment, the anti-fog layer has a composition different from the protective layer. Alternatively the anti-fog layer may have a composition similar to or the same as the protective layer.

Cellulose Acetate

Cellulose is generally known to be a semi-synthetic polymer containing anhydroglucose repeating units with three hydroxyl groups per anhydroglucose unit. Cellulose acetate may be formed by esterifying cellulose after activating the cellulose with acetic acid. The cellulose may be obtained from numerous types of cellulosic material, including but not limited to plant derived biomass, corn stover, sugar cane stalk, bagasse and cane residues, rice and wheat straw, agricultural grasses, hardwood, hardwood pulp, softwood, softwood pulp, cotton linters, switchgrass, bagasse, herbs, recycled paper, waste paper, wood chips, pulp and paper wastes, waste wood, thinned wood, willow, poplar, perennial grasses (e.g., grasses of the *Miscanthus* family), bacterial cellulose, seed hulls (e.g., soy beans), cornstalk, chaff, and other forms of wood, bamboo, soyhull, bast fibers, such as kenaf, hemp, jute and flax, agricultural residual products, agricultural wastes, excretions of livestock, microbial, algal cellulose, seaweed and all other materials proximately or ultimately derived from plants. Such cellulosic raw materials are preferably processed in pellet, chip, clip, sheet, attritioned fiber, powder form, or other form rendering them suitable for further purification. Combinations of sources are also within the contemplation of the invention.

Cellulose esters suitable for use in producing the anti-fog layer of the present invention may, in some embodiments, have ester substituents that include, but are not limited to, $C_1$-$C_{20}$ aliphatic esters (e.g., acetate, propionate, or butyrate), functional $C_1$-$C_{20}$ aliphatic esters (e.g., succinate, glutarate, maleate) aromatic esters (e.g., benzoate or phthalate), substituted aromatic esters, and the like, any derivative thereof, and any combination thereof. In some cases, however, the content of cellulose acetate propionate and/or cellulose propionate may be beneficially limited (cellulose acetate propionates/cellulose propionates may be cost-prohibitive). Cellulose esters suitable for use in producing the anti-fog layer of the present invention may, in some embodiments, have a molecular weight ranging from a lower limit of about 10,000, 15,000, 25,000, 50,000, or 85,000 to an upper limit of about 125,000, 100,000, or 85,000, and wherein the molecular weight may range from any lower limit to any upper limit and encompass any subset therebetween. In one embodiment, the number average molecular weight of the cellulose acetate may range from 40,000 amu to 100,000 amu, e.g., from 50,000 amu to 80,000 amu.

The cellulose acetate used in the production of the anti-fog layer may be cellulose diacetate or cellulose triacetate. In one embodiment, the cellulose acetate comprises cellulose diacetate. In one embodiment, the anti-fog layer comprises low amounts, if any, cellulose triacetate, cellulose acetate propionate, and/or, cellulose propionate e.g., less than 5 wt %, less than 4 wt %, less than 3 wt %, less than 2 wt %, less than 1 wt %, or less than 0.5 wt %. In some cases, the anti-fog layer is substantially free of cellulose triacetate, cellulose acetate propionate, and/or, cellulose propionate, e.g., free of cellulose triacetate, cellulose acetate propionate, and/or, cellulose propionate.

Cellulose acetate has an acetyl value, which is a measure of the degree of substitution of the cellulose acetate. The acetyl value represents the weight percent of acetic acid liberated by the saponification of cellulose acetate. The acetyl value and degree of substitution are linearly related. The degree of substitution may be calculated from the acetyl value according to the following formula:

$$\text{Degree of substitution} = \frac{\text{Acetyl value} \times 162}{6005 - (\text{Acetyl value} \times 42)}$$

In the production of the anti-fog layer various solvents and adhesives may be used as bonding agents to bond continuous film layers together and to bond opposing cellulose acetate layers together. The solubility and, hence, bonding ability of cellulose acetate in a solvent depends, at least in part, on the acetyl value of the cellulose acetate. As the acetyl value decreases, solubility of the cellulose acetate may improve in ketones, esters, nitrogen-containing compounds, glycols and ethers. As the acetyl value increases, solubility of the cellulose acetate may improve in halogenated hydrocarbons. As a result, the acetyl value and degree of substitution of the cellulose acetate employed as well as the desired bonding agent for bonding the continuous film layers may impact the ability to form durable and mechanically uniform anti-fog compositions.

The cellulose acetate may be utilized in powder or flake form, preferably flake form, to form the dope used in a solvent casting process to form the precursor film. In other embodiments, the cellulose acetate, in powder or flake form, may be formulated and injection molded into pellets that may be extruded into the precursor film.

The flake form of cellulose acetate may have an average flake size from 5 µm to 10 mm, as determined by sieve analysis. The flake preferably has low moisture content, optionally comprising less than 6 wt % water, e.g., less than 5 wt % water or less than 2.5 wt % water. In terms of ranges, the flake form may have from 0.01 to 6 wt % water, e.g., from 0.1 to 2.5 wt % water or from 0.5 to 2.45 wt % water. Prior to mixing, the cellulose acetate flake may be heated to remove moisture. In some embodiments, the cellulose acetate flake may be dried until it has a water content of less than 2 wt. %, e.g., less than 1.5 wt. %, less than 1 wt. % or less than 0.2 wt. %, The drying may be conducted at a temperature from 30 to 100° C., e.g., from 50 to 80° C. and for a period of 1 to 24 hours, e.g., from 5 to 20 hours or from 10 to 15 hours.

Optional Additives

An anti-blocking agent may be utilized in the anti-fog layer. The anti-blocking agent may have an average particle size less than 6 microns, e.g., less than 5 microns, less than 4 microns, less than 3 microns, less than 2 microns, or less than 1 micron. In terms of ranges, the anti-blocking agent desirably has a small average particle size, e.g., from 0.02 microns to 6 microns, from 0.02 microns to 5 microns, from 0.02 microns to 3 microns, from 0.02 microns to 1 micron, from 0.05 microns to 6 microns, from 0.05 microns to 5 microns, from 0.1 micron to 5 microns, from 0.1 microns to 4 microns, from 0.5 microns to 5 microns, from 0.5 microns to 4 microns, from 0.5 microns to 3 microns, from 0.5 microns to 3 microns, from 1 micron to 6 microns, from 1 micron to 5 microns, or from 1 micron to 4 microns. The particle size may be determined, for example, by sieve analysis. Many conventional anti-fog compositions, e.g., those formed via extrusion processes, do not experience inter-layer problems, e.g., "glass bonding effects," which necessitate the use of anti-blocking agents. Thus, conventional extrusion-formed films typically do not contain anti-blocking agents.

The anti-fog layer, in one embodiment, comprises from 0.01 wt % to 10 wt % anti-blocking agent, e.g., from 0.05 wt % to 5 wt %, from 0.05 wt % to 1 wt %, or from 0.05 wt % to 0.5 wt %. In terms of lower limits, the anti-fog layer may comprise at least 0.01 wt %, at least 0.05 wt % or at least 0.07 wt % anti-blocking agent. In terms of upper limits, the anti-fog layer may comprise less than 10 wt % anti-blocking agent, e.g., less than 7 wt %, less than 5 wt %, less than 1 wt %, or less than 0.5 wt %. Additional details of the components of the above-mentioned components are provided herein.

The anti-blocking agent may vary widely. In preferred embodiments, the anti-blocking agent comprises an inorganic compound. For example, the anti-blocking agent may comprise oxides, carbonates, talc, clay, kaolin, silicates, and/or phosphates. In one embodiment, the anti-blocking agent may be selected from the group consisting of titanium dioxide, aluminum oxide, zirconium oxide, silicon dioxide, calcium carbonate, calcium silicate, aluminum silicate, magnesium silicate, calcium phosphate and mixtures thereof. In one embodiment, the anti-blocking agent comprises silica. Some suitable commercial products include Aerosil® products (from Evonik Industries AG, Germany). One specific suitable commercial product is Aerosil R972.

In some embodiments, the anti-fog layer further comprises a releasing agent, which allows the anti-fog layer to release from various components during or after the production process, e.g., releasing from a casting band. In one embodiment, the anti-fog layer comprises from 0.01 wt % to 10 wt % releasing agent, e.g., from 0.05 wt % to 5 wt %, from 0.05 wt % to 1 wt %, or from 0.05 wt % to 0.5 wt %. In terms of lower limits, the anti-fog layer may comprise at least 0.01 wt %, at least 0.05 wt % or at least 0.07 wt % releasing agent. In terms of upper limits, the anti-fog layer may comprise less than 10 wt % releasing agent, e.g., less than 7 wt %, less than 5 wt %, less than 1 wt %, or less than 0.5 wt %. The composition of the releasing agent may vary widely, and many releasing agents are known in the art. In one embodiment, the releasing agent comprises stearic acid. The releasing agent is preferably added to, e.g., mixed into, the dope. In such cases, the release agent preferably is dissolved into the dope. In one embodiment, the releasing agent is deposited or injected onto the casting band upon which the anti-fog layer is cast. As the anti-fog layer is released from the casting band, some of the releasing agent may remain with the anti-fog layer and/or some of the release agent may remain with the casting band (based on the attraction of the release agent to the metal).

In some embodiments, the anti-fog layer comprises residual acetone from the manufacturing process. For example, the anti-fog layer may comprise from 0.01 wt % to 3 wt % acetone, e.g., from 0.05 wt % to 2 wt %, from 0.05 wt % to 1 wt %, or from 0.05 to 0.5 wt %. In terms of lower limits, the anti-fog layer may comprise at least 0.01 wt % acetone, e.g., at least 0.05 wt % or at least 0.1 wt %. In terms of upper limits, the anti-fog layer may comprise less than 3 wt % acetone, e.g., less than 2 wt %, less than 1 wt %, less than 0.5 wt %, or less than 0.1 wt %.

In some embodiments, the anti-fog layer, and the dope preferably used to form the anti-fog layer, may further comprise one or more additional additives, e.g., tackifiers, flame retardants, antioxidants, antibacterial agents, antifungal agents, colorants, pigments, dyes, UV-stabilizers, viscosity modifiers, processing additives, aromas, and the like, and any combination thereof. The amount of the additives may vary widely. Generally speaking the one or more additives may be present in an amount ranging from 0.01 to 10 wt. %, based on the total weight of the anti-fog layer, e.g., from 0.03 to 2 wt. %, or from 0.1 to 1 wt. %.

In one embodiment, UV absorber additives may be included in the anti-fog layer. For example, the anti-fog layer (with a UV absorber additive) may be utilized in a situation where UV light may damage the contents enclosed by the anti-fog layer.

Tackifiers may, in some embodiments, increase the adhesive properties of the anti-fog layer described herein. Tackifiers suitable for use in conjunction with the anti-fog layer described herein may, in some embodiments, include, but are not limited to, methylcellulose, ethylcellulose, hydroxyethylcellulose, carboxy methylcellulose, carboxy ethylcellulose, amides, diamines, polyesters, polycarbonates, silyl-modified polyamide compounds, polycarbamates, urethanes, natural resins, natural rosins, shellacs, acrylic acid polymers, 2-ethylhexylacrylate, acrylic acid ester polymers, acrylic acid derivative polymers, acrylic acid homopolymers, anacrylic acid ester homopolymers, poly(methyl acrylate), poly(butyl acrylate), poly(2-ethylhexyl acrylate), acrylic acid ester co-polymers, methacrylic acid derivative polymers, methacrylic acid homopolymers, methacrylic acid ester homopolymers, poly(methyl methacrylate), poly(butyl methacrylate), poly(2-ethylhexyl methacrylate), acrylamido-methyl-propane sulfonate polymers, acrylamido-methyl-propane sulfonate derivative polymers, acrylamido-methyl-propane sulfonate co-polymers, acrylic acid/acrylamido-methyl-propane sulfonate co-polymers, benzyl coco di-(hydroxyethyl) quaternary amines, p-T-amyl-phenols condensed with formaldehyde, dialkyl amino alkyl (meth)acrylates, acrylamides, N-(dialkyl amino alkyl) acrylamide, methacrylamides, hydroxy alkyl (meth)acrylates, methacrylic acids, acrylic acids, hydroxyethyl acrylates, and the like, any derivative thereof, and any combination thereof.

Antifungal agents suitable for use in conjunction with the anti-fog layer described herein may, in some embodiments, include, but are not limited to, polyene antifungals, e.g., natamycin, rimocidin, filipin, nystatin, amphotericin B, candicin, and hamycin, imidazole antifungals such as miconazole (available as MICATIN® from WellSpring Pharmaceutical Corporation), ketoconazole (commercially available as NIZORAL® from McNeil consumer Healthcare), clotrimazole (commercially available as LOTRAMIN® and LOTRAMIN AF® available from Merck and CANESTEN® available from Bayer), econazole, omoconazole, bifonazole, butoconazole, fenticonazole, isoconazole, oxiconazole, sertaconazole (commercially available as ERTACZO® from OrthoDematologics), sulconazole, and tioconazole; triazole antifungals such as fluconazole, itraconazole, isavuconazole, ravuconazole, posaconazole, voriconazole, terconazole, and albaconazole), thiazole antifungals (e.g., abafungin), allylamine antifungals (e.g., terbinafine (commercially available as LAMISIL® from Novartis Consumer Health, Inc.), naftifine (commercially available as NAFTIN® available from Merz Pharmaceuticals), and butenafine (commercially available as LOTRAMIN ULTRA® from Merck), echinocandin antifungals (e.g., anidulafungin, caspofungin, and micafungin), polygodial, benzoic acid, ciclopirox, tolnaftate (e.g., commercially available as TINACTIN® from MDS Consumer Care, Inc.), undecylenic acid, flucytosine, 5-fluorocytosine, griseofulvin, haloprogin, and any combination thereof.

Colorants, pigments, and dyes suitable for use in conjunction with the anti-fog layer (or the multi-layer composition as a whole) described herein may, in some embodiments, include, but are not limited to, plant dyes, vegetable dyes, titanium dioxide, silicon dioxide, tartrazine, E102, phthalocyanine blue, phthalocyanine green, quinacridones, perylene tetracarboxylic acid di-imides, dioxazines, perinones disazo pigments, anthraquinone pigments, carbon black, metal powders, iron oxide, ultramarine, nickel titanate, benzimidazolone orange gl, solvent orange 60, orange dyes, calcium carbonate, kaolin clay, aluminum hydroxide, barium sulfate, zinc oxide, aluminum oxide, CARTASOL® dyes (cationic dyes, available from Clariant Services) in liquid and/or granular form (e.g., CARTASOL Brilliant Yellow K-6G liquid, CARTASOL Yellow K-4GL liquid, CARTASOL Yellow K-GL liquid, CARTASOL Orange K-3GL liquid, CARTASOL Scarlet K-2GL liquid, CARTASOL Red K-3BN liquid, CARTASOL Blue K-5R liquid, CARTASOL Blue K-RL liquid, CARTASOL Turquoise K-RL liquid/granules, CARTASOL Brown K-BL liquid), FASTUSOL® dyes (an auxochrome, available from BASF) (e.g., Yellow 3GL, Fastusol C Blue 74L), and the like, any derivative thereof, and any combination thereof. In some embodiments, when the colorant is titanium dioxide is utilized as the colorant, the titanium dioxide may also function to increase the stiffness of the film. In one embodiment, solvent dyes may be employed.

Process for Producing the Anti-Fog Layer

The anti-fog layer may be produced by combining cellulose acetate, plasticizer, and solvent to form a dope, and casting, e.g., solvent casting, the dope to form the precursor film. The process may further comprise the step of contacting the precursor film with a caustic solution to form a treated film. In one embodiment, the treatment of the precursor film serves to partially or completely saponify the precursor film, thus creating the desired (uniform or non-uniform) degree of substitution, as discussed herein. The process further comprises the steps of washing the treated film to form a washed film and drying the washed film to form the anti-fog layer. The washing, in some embodiments, inhibits or eliminates the formation of salts on the surface of the treated film. In one embodiment, the drying is achieved via oven drying. In one embodiment, the drying is achieved simply via air drying.

In one embodiment, the process comprises the step of combining cellulose acetate, plasticizer, and acetone to form the dope and casting, e.g., solvent casting, the dope to form the anti-fog layer. The resultant anti-fog layer may comprise acetone, e.g., from 0.01 wt % to 3 wt % acetone.

Processes for preparing cellulose acetate films have been described in U.S. Pat. Nos. 2,232,012 and 3,528,833, the entireties of which are incorporated by reference herein. In general, the solvent casting process comprises casting a mixture comprising plasticizer, anti-blocking agent, and cellulose acetate dissolved in a solvent, e.g., acetone. The components of the mixture and the respective amounts determine the characteristics of the anti-fog layer, which are discussed herein.

In one embodiment, the mixture (dope) may be prepared by dissolving cellulose acetate in a solvent. In some embodiments, the solvent is acetone. In one embodiment the solvent is selected from the group consisting of ethyl lactate methyl ethyl ketone, and dichlormethane. To improve the solubility of cellulose acetate in acetone, the cellulose acetate and acetone are preferably continuously added to a first mixer. The mixture may then be sent to a second and/or third mixer to allow for full dissolution of the cellulose acetate in the acetone. The mixers may be continuous mixers that are used in series. It is understood that in some embodiments, one mixer may be sufficient to achieve cellulose acetate dissolution. In other embodiments, two, three, or more mixers (e.g., four mixers, five mixers, or greater than five mixers) may be used in series or in parallel. In yet other embodiments, the cellulose acetate, solvent, and other additives may be combined in one or more blenders, without the use of any mixers.

The mixture may further comprise a processing additive. Additionally, the mixture may comprise a colorant. The plasticizer may be added directly to the first mixer or may be blended with at least a portion of the solvent and then added to the first mixer. Similarly, the colorant, anti-blocking agent and/or processing additive may be added directly to the first mixer or may be combined with a portion of the solvent and then added to the first mixer.

Once the cellulose acetate has been dissolved in the acetone solvent, the mixture may be referred to as dope. The dope may then be filtered to remove impurities. In some embodiments, the filtering is a two-stage filtration.

In embodiments in which the dope is solution cast, the cellulose acetate is generally used in flake form. The (flake) cellulose acetate may then be dissolved in acetone to form an acetone dope. Additional components, including the plasticizers and the anti-blocking agent may be included with the acetone dope. The acetone dope may also comprise one or more of anti-blocking agents, stearic acid, dyes and/or one or more specialty chemicals. The components are then mixed as described above. The resultant mixture may then be filtered. The mixture then may be cast into a continuous film by die extrusion. The film may be dried in a warm air drying cabinet comprising rollers.

In one embodiment, after forming a mixture comprising cellulose acetate, plasticizer, and optional additives, the mixture may be melt extruded in a film die to form a sheet or melt extruded in a small hole die to form filaments which are then sent to a pelletizer to form pellets. The melt extrusion may be performed at a temperature of up to 230° C., e.g., up to 220° C. or up to 210° C. A temperature greater than 230° C. may lead to destabilization of the mixture components, particularly of the cellulose acetate. The melt extruder may be a twin screw feeder with co-rotating screws, and may be operated at a screw speed from 100 to 500 rpm, e.g., from 150 to 450 rpm, or from 250 to 350 rpm. The sheet may have a thickness between 0.5 and 0.6 mm, e.g., from 0.53 to 0.54 mm.

In one embodiment, the precursor film is formed via a melt extrusion process. The process for producing an anti-fog layer may comprise the step of extruding pellets comprising cellulose acetate and plasticizer. The process further comprises the step of contacting the precursor film with a caustic solution to form a treated film. The process may further comprise the step(s) of washing the treated film to form a washed film and/or drying the washed film to form the anti-fog layer.

One method to reduce the melting temperature of the cellulose acetate is to form a mixture comprising a plasticizer and the cellulose acetate prior to melt extrusion or solvent casting. In some embodiments, at least one additive may also be mixed with the plasticizer and cellulose acetate to form the pellet mixture. The cellulose acetate may be present in an amount from 75 to 98 wt. % of the mixture, e.g., from 80 to 97.5 wt. % or from 85 to 95 wt. %. Weight percentages are based on the total weight of the mixture, which includes the weight of the cellulose acetate, the plasticizer, and any additives included in the mixture. As noted above, the cellulose acetate may be provided as a flake or as a powder.

The pellet mixture may be formed by combining cellulose acetate, in flake or powder form, with plasticizer in a high speed mixer. In some embodiments, the plasticizer may be combined with the cellulose acetate using a spray distribution system during the mixing step. In other embodiments, the plasticizer may be added to the cellulose acetate during the mixing step, either continuously or intermittently. In some embodiments, the flake form of cellulose acetate is preferred. If included in the mixture, the additives may be combined with the cellulose acetate and plasticizer during the mixing step. In some embodiments, the high speed mixer may be may be operated for 1 to 2 minutes. In some embodiments, a base mixture may be prepared and the base mixture may then be adjusted to obtain with additional plasticizer and/or additives.

In some embodiments when an extrusion process is utilized to form the precursor film, antioxidants may, in some embodiments, mitigate oxidation and/or chemical degradation of the anti-fog composition described herein during storage, transportation, and/or implementation. Antioxidants suitable for use in conjunction with the anti-fog composition described herein may, in some embodiments, include, but are not limited to, anthocyanin, ascorbic acid, glutathione, lipoic acid, uric acid, resveratrol, flavonoids, carotenes (e.g., beta-carotene), carotenoids, tocopherols (e.g., alpha-tocopherol, beta-tocopherol, gamma-tocopherol, and delta-tocopherol), tocotrienols, ubiquinol, gallic acids, melatonin, secondary aromatic amines, benzofuranones, hindered phenols, polyphenols, hindered amines, organophosphorus compounds, thioesters, benzoates, lactones, hydroxylamines, and the like, and any combination thereof. In one embodiment, the antioxidant may be selected from the group consisting of stearyl 3-(3,5-di-tert-butyl-4-hydroxyphenyl) propionate, bis(2,4-dicumylphenyl)pentaerythritol diphosphite, tris(2,4-di-tert-butylphenyl)phosphite, bisphenol A propoxylate diglycidyl ether, 9,10-dihydroxy-9-oxa-10-phosphaphenanthrene-10-oxide and combinations thereof.

In some melt extrusion-related embodiments, viscosity modifiers are employed. Viscosity modifiers suitable for use in conjunction with the anti-fog composition described herein may, in some embodiments, include, but are not limited to, polyethylene glycols, and the like, and any combination thereof, which, in some embodiments, may be a food-grade viscosity modifier.

The caustic treatment may be achieved via a wide variety of methods. An exemplary method is alkali saponification treatment. For example, see International Patent Application No. WO 2008/029801, which is incorporated herein by reference. The caustic treatment alters the degree of substitution of the precursor film, which, increases the hydrophilicity of the precursor film, and improves the anti-fog characteristics of the anti-fog composition. In one embodiment, the caustic treatment substitutes one or more of the acetyl groups of the cellulose acetate with another substituent, e.g., a hydroxyl group, a carbonyl group, or a carboxylic acid group.

In one embodiment, the precursor film is submerged in a bath of caustic solution. In another embodiment, the precursor film is bonded to one or more additional films, of the same or different composition, prior to treatment. As noted herein, multiple precursor layers may be formed and then stacked upon one another, e.g., to achieve a thicker precursor film. The stacked precursor film may then be treated with caustic solution.

The caustic solution may comprise any suitable alkali solution, many of which are known in the art. The caustic solution, in one embodiment, comprises an aqueous hydroxide solution. The caustic solution may comprise from 5 wt % to 20 wt % alkali solution, e.g., from 5 wt % to 15 wt % or from 7 wt % to 15 wt %. In some embodiments, the caustic solution comprises a potassium hydroxide solution present in the amounts discussed herein. The combination of the specific composition of the precursor film and the caustic treatment advantageously provides for the anti-fog composition having the features described herein, e.g., the ability absorb some water. In one embodiment, the caustic solution treatment step is conducted for a residence time ranging from 0.5 minutes to 20 minutes, e.g., from 2 minutes to 10 minutes. In terms of lower limits, the caustic solution treatment step may be conducted for a residence time greater than 0.5 minutes, e.g., greater than 2 minutes or greater than 5 minutes. In terms of upper limits, the caustic solution treatment step may be conducted for a residence time less than 20 minutes, e.g., less than 15 minutes or less than 10 minutes.

In one embodiment, the caustic solution treatment step is conducted at a temperature ranging from 40° C. to 100° C., e.g., from 45° C. to 75° C., or 50° C. to 70° C. Generally speaking, hotter treatment temperatures may result in faster saponification. Treatment temperature, in some cases, is inversely proportional to the duration of the treatment. In terms of lower limits, the caustic solution treatment step may be conducted at a temperature greater than 40° C., e.g., greater than 45° C., greater than 50° C., or greater than 65° C. In terms of upper limits, the caustic solution treatment step may be conducted at a temperature less than 100° C., e.g., less than 75° C., or less than 70° C.

The composition of the caustic solution may vary widely. In one embodiment, the molarity of the caustic solution is from 0.1M to 25M, e.g., from 0.1M to 17.5M, from 2M to 10M, or from 2M to 2.5M. Various combinations of processing conditions, e.g., residence time, temperature, molarity, and caustic solution composition, are contemplated. For example, in a preferred embodiment, the caustic solution comprises a 3M potassium hydroxide solution and the treatment is performed at 60° C. for 5 or 10 minutes. In another embodiment, the caustic solution comprises a 2.8M potassium hydroxide solution and the treatment is performed at 72.1° C. for 20 minutes.

In one embodiment, the process comprises the step of contacting the precursor film with acetone prior to saponifying. Without being bound by theory, contacting the cellulose acetate precursor film with acetone may open up the pores of the film, soften the surface of the film, and/or makes the film more porous, which advantageously provides for improved, faster saponification.

As noted above, the process further comprises the step of washing the treated film, e.g., with water. The washing step may be achieved by any suitable technique, many of which are known in the art. The washing step washes the surface of the treated film. In one embodiment, the washing is conducted at a temperature ranging from 0° C. to 50° C., e.g., from 20° C. to 40° C. or from 25° C. to 35° C. In terms of lower limits, the washing may be conducted at a temperature greater than 0° C., e.g., greater than 20° C., or greater than 25° C. In terms of upper limits, the washing may be conducted at a temperature less than 50° C., e.g., less than 40° C., or less than 35° C.

The process further comprises the step of drying the washed film to form the anti-fog layer. The drying step may be achieved by any suitable technique, many of which are known in the art. In one embodiment, the drying is achieved via oven drying. In one embodiment, the drying is achieved simply via air drying at ambient conditions. In one embodiment, the drying is conducted at a temperature ranging from 50° C. to 120° C., e.g., from 50° C. to 100° C. or from 60° C. to 80° C. In terms of lower limits, the drying may be conducted at a temperature greater than 50° C., e.g., greater than 55° C., or greater than 60° C. In terms of upper limits, the washing may be conducted at a temperature less than 120° C., e.g., less than 100° C., or less than 80° C.

In one embodiment, the present invention relates to a consumer product composition comprising as one component thereof the multi-layer composition discussed herein. Thus, in some cases, the consumer product composition comprises a consumer product and the multi-layer composition. In one embodiment, the multi-layer composition will be attached to the consumer product. The methods for attachment will vary widely. In one embodiment, the consumer product will have a planar surface and the multi-layer composition will be disposed on, e.g., attached to, the planar surface.

The list of contemplated consumer products is vast. As one example, the consumer product may be selected from the group consisting of lenses, windows, screens, glass structures, containers, appliances, plastic, optical devices, and visors.

Process for Producing a Multi-Layer Anti-Fog Composition

In one embodiment, the invention relates to a process for producing the multi-layer anti-fog composition. The process comprises the steps of: combining cellulose acetate and plasticizer and solvent to form a dope; casting the dope to form a precursor layer; contacting the precursor film with a caustic solution to form a treated layer; washing the treated layer to form a washed layer; and drying the washed layer to form the anti-fog layer.

The process further comprises the step of attaching to the anti-fog layer the protective layer using the connector(s) to form the multi-layered structure. The protective layer is configured substantially coplanar, at least in part, to the anti-fog layer. The connector(s) extend through the multi-layered structure.

In one embodiment, the present invention relates to a process for producing an anti-fog composition comprising an anti-fog layer, the process comprising the steps of: extruding pellets comprising cellulose acetate and plasticizer and optionally an antioxidant and/or a heat stabilizer, to form a precursor layer; contacting the precursor layer with a caustic solution to form a treated layer; washing the treated layer to form a washed layer; and drying the washed layer to form the anti-fog layer. The process further comprises the step of attaching to the anti-fog layer the protective layer using the connector(s) to form the multi-layered structure. The protective layer is configured substantially coplanar, at least in part, to the anti-fog layer. The connector(s) extend through the multi-layered structure.

EXAMPLES

Dope samples were prepared and hand casted as shown in Tables 1a-k. Examples 1-12 are working examples. The remaining examples are comparative.

TABLE 1a

Dope Formulations (in pph)

|  | Ex. 1 TCPP10 | Ex. 2 TCPP10 | Ex. 3 TCPP20 | Ex. 4 TCPP20 | Ex. 5 TCPP30 | — |
|---|---|---|---|---|---|---|
| Acetone | 275.00 | 270.00 | 275.00 | 280.00 | 275.00 | — |
| Stearic acid (opt.) | 0.06 | 0.06 | 0.06 | 0.06 | 0.06 | — |
| Silica (opt.) | 0.10 | 0.16 | 0.10 | 0.12 | 0.10 | — |
| TCPP (Plas.) | 8.00 | 7.99 | 16.00 | 16.02 | 22.00 | — |
| Cellulose Acetate | 80.00 | 84.65 | 80.00 | 80.08 | 80.00 | — |
| CA Conc. | 24.28 | 26.20 | 25.91 | 25.61 | 27.47 | — |
| Plasticizer Ratio | 9.98 | 12.96 | 19.96 | 20.08 | 29.94 | — |

|  | Ex. 6 TCPP10 | Ex. 7 TCPP15 | Ex. 8 TCPP15 | Ex. 9 TCPP20 | Ex. 10 TCPP20 | Ex. 11 TCPP25 | Ex. 12 TCPP25 |
|---|---|---|---|---|---|---|---|
| Acetone | 270.00 | 275.00 | 270.00 | 275.00 | 260.00 | 275.00 | 270.00 |
| Stearic acid (opt.) | 0.06 | 0.06 | 0.06 | 0.06 | 0.06 | 0.06 | 0.06 |
| Silica (opt.) | 0.10 | 0.10 | 0.11 | 0.10 | 0.11 | 0.10 | 0.10 |
| TCPP (Plas.) | 8.03 | 12.00 | 12.02 | 16.00 | 16.26 | 20.00 | 20.19 |
| Cellulose Acetate | 80.32 | 80.00 | 80.41 | 80.00 | 80.24 | 80.00 | 80.11 |
| CA Conc. | 24.69 | 25.10 | 25.54 | 25.91 | 27.10 | 26.70 | 27.12 |
| Plasticizer Ratio | 9.98 | 14.97 | 14.92 | 19.96 | 20.22 | 24.95 | 25.15 |

TABLE 1b

Comparative Dope Formulations (in pph)

|  | Ex. B1 ATEC10 | Ex. B2 ATEC10 | Ex. B3 ATEC20 | Ex. B4 ATEC20 | Ex. B5 ATEC30 | Ex. B6 ATEC30 |
|---|---|---|---|---|---|---|
| Acetone | 275.00 | 283.00 | 275.00 | 277.67 | 275.00 | 276.12 |
| Stearic acid (opt.) | 0.06 | 0.07 | 0.06 | 0.08 | 0.06 | 0.07 |
| Silica (opt.) | 0.10 | 0.11 | 0.10 | 0.10 | 0.10 | 0.11 |
| ATEC (Plas.) | 8.00 | 7.99 | 16.00 | 16.02 | 22.00 | 22.05 |
| Cellulose Acetate | 80.00 | 80.42 | 80.00 | 80.44 | 65.00 | 65.36 |
| CA Conc. | 24.28 | 23.84 | 25.91 | 25.82 | 24.07 | 24.08 |
| Plasticizer Ratio | 9.98 | 9.91 | 19.96 | 19.87 | 33.76 | 33.64 |

TABLE 1c

Comparative Dope Formulations (in pph)

|  | Ex. C1 TPP10 | Ex. C2 TPP10 | Ex. C3 TPP20 | Ex. C4 TPP20 | Ex. C5 TPP30 | Ex. C6 TPP30 |
|---|---|---|---|---|---|---|
| Acetone | 275.00 | 283.00 | 275.00 | 277.67 | 275.00 | 276.12 |
| Stearic acid (opt.) | 0.06 | 0.07 | 0.06 | 0.08 | 0.06 | 0.07 |
| Silica (opt.) | 0.10 | 0.11 | 0.10 | 0.10 | 0.10 | 0.11 |
| TPP (Plas.) | 8.00 | 7.99 | 16.00 | 16.02 | 22.00 | 22.05 |
| Cellulose Acetate | 80.00 | 80.42 | 80.00 | 80.44 | 65.00 | 65.36 |
| CA Conc. | 24.28 | 23.84 | 25.91 | 25.82 | 24.07 | 24.08 |
| Plasticizer Ratio | 9.98 | 9.91 | 19.96 | 19.87 | 33.76 | 33.64 |

TABLE 1d

Comparative Dope Formulations (in pph)

|  | Ex. D1 TEC10 | Ex. D2 TEC10 | Ex. D3 TEC20 | Ex. D4 TEC20 | Ex. D5 TEC30 | Ex. D6 TEC30 |
|---|---|---|---|---|---|---|
| Acetone | 275.00 | 270.00 | 275.00 | 275.00 | 275.00 | 278.00 |
| Stearic acid (opt.) | 0.06 | 0.06 | 0.06 | 0.06 | 0.06 | 0.08 |
| Silica (opt.) | 0.10 | 0.10 | 0.10 | 0.10 | 0.10 | 0.10 |
| TEC (Plas.) | 8.00 | 8.02 | 16.00 | 16.07 | 24.00 | 23.99 |
| Cellulose Acetate | 80.00 | 80.22 | 80.00 | 80.65 | 80.00 | 80.15 |
| CA Conc. | 24.28 | 24.67 | 25.91 | 26.05 | 27.47 | 27.29 |
| Plasticizer Ratio | 9.98 | 9.98 | 19.96 | 19.89 | 29.94 | 29.86 |

TABLE 1e

Comparative Dope Formulations (in pph)

|  | Ex. E1 NETS10 | Ex. E2 NETS10 | Ex. E3 NETS20 | Ex. E4 NETS20 | Ex. E5 NETS30 | Ex. E6 NETS30 |
|---|---|---|---|---|---|---|
| Acetone | 275.00 | 283.00 | 275.00 | 277.67 | 275.00 | 276.12 |
| Stearic acid (opt.) | 0.06 | 0.07 | 0.06 | 0.08 | 0.06 | 0.07 |
| Silica (opt.) | 0.10 | 0.11 | 0.10 | 0.10 | 0.10 | 0.11 |
| NETS (Plas.) | 8.00 | 7.99 | 16.00 | 16.02 | 22.00 | 22.05 |
| Cellulose Acetate | 80.00 | 80.42 | 80.00 | 80.44 | 65.00 | 65.36 |
| CA Conc. | 24.28 | 23.84 | 25.91 | 25.82 | 24.07 | 24.08 |
| Plasticizer Ratio | 9.98 | 9.91 | 19.96 | 19.87 | 33.76 | 33.64 |

TABLE 1f

Comparative Dope Formulations (in pph)

|  | Ex. F1 DMS10 | Ex. F2 DMS10 | Ex. F3 DMS20 | Ex. F4 DMS20 | Ex. F5 DMS30 | Ex. F6 DMS30 |
|---|---|---|---|---|---|---|
| Acetone | 275.00 | 280.00 | 275.00 | 275.00 | 275.00 | 280.00 |
| Stearic acid (opt.) | 0.06 | 0.10 | 0.06 | 0.08 | 0.06 | 0.06 |
| Silica (opt.) | 0.10 | 0.09 | 0.10 | 0.10 | 0.10 | 0.10 |
| DMS (Plas.) | 8.00 | 8.02 | 16.00 | 16.00 | 24.00 | 24.07 |
| Cellulose Acetate | 80.00 | 80.22 | 80.00 | 80.45 | 80.00 | 80.05 |
| CA Conc. | 24.28 | 24.00 | 25.91 | 26.00 | 27.47 | 27.14 |
| Plasticizer Ratio | 9.98 | 9.97 | 19.96 | 19.84 | 29.94 | 30.01 |

TABLE 1g

Comparative Dope Formulations (in pph)

|  | Ex. G1 BB10 | Ex. G2 BB10 | Ex. G3 BB20 | Ex. G4 BB20 | Ex. G5 BB30 |
|---|---|---|---|---|---|
| Acetone | 275.00 | 275.00 | 275.00 | 300.00 | 275.00 |
| Stearic acid (opt.) | 0.06 | 0.06 | 0.06 | 0.06 | 0.06 |
| Silica (opt.) | 0.10 | 0.10 | 0.10 | 0.11 | 0.10 |
| BB (Plas.) | 8.00 | 8.08 | 16.00 | 16.21 | 24.00 |
| Cellulose Acetate | 80.00 | 80.24 | 80.00 | 79.95 | 80.00 |
| CA Conc. | 24.28 | 24.34 | 25.91 | 24.31 | 27.47 |
| Plasticizer Ratio | 9.98 | 10.05 | 19.96 | 20.23 | 29.94 |

The dopes were casted and formed into films. The films were saponified, e.g., dipped one at a time into a potassium hydroxide solution, with retention time, temperature, and concentration monitored. Initial haze, haze after saponification, and haze Δ were measured/calculated. Haze was measured in accordance with ASTM D1003 (2016 or equivalent). Saponification conditions and haze measurements are shown in Table 2.

TABLE 2

Saponification Conditions and Performance Characteristics

| | PR Ratio | Gauge | Sap Temp | Sap Time | KOH % | In. Haze | Haze | Haze Δ |
|---|---|---|---|---|---|---|---|---|
| Working Examples | | | | | | | | |
| TCPP10 | 10 | 125 | 5.00 | 40.0 | 10.00 | 1.2 | 1.8 | 0.6 |
| TCPP20 | 20 | 140 | 5.00 | 40.0 | 10.00 | 1.2 | 1.3 | 0.1 |
| TCPP10 | 10 | 125 | 5.00 | 60.0 | 10.00 | 1.2 | 2.4 | 1.2 |
| TCPP20 | 20 | 140 | 5.00 | 60.0 | 10.00 | 1.2 | 1.4 | 0.2 |
| TCPP10 | 10 | 125 | 15.00 | 60.0 | 10.00 | 1.2 | 2.4 | 1.2 |
| TCPP20 | 20 | 140 | 15.00 | 60.0 | 10.00 | 1.2 | 1.8 | 0.6 |
| Comparative Examples | | | | | | | | |
| TEC10 | 10 | 125 | 5.00 | 40.0 | 10.00 | 0.90 | 25.8 | 24.9 |
| TEC20 | 20 | 150 | 5.00 | 40.0 | 10.00 | 1.30 | 13.7 | 12.4 |
| NETS10 | 10 | 140 | 5.00 | 40.0 | 10.00 | 1.6 | 6.0 | 4.4 |
| NETS20 | 20 | 120 | 5.00 | 40.0 | 10.00 | 1.5 | 4.2 | 2.7 |
| DMS10 | 10 | | 5.00 | 40.0 | 10.00 | 0.9 | 4.5 | 3.6 |
| DMS30 | 30 | 140 | 5.00 | 40.0 | 10.00 | 0.9 | 4.9 | 4.0 |
| TPP10 | 10 | 280 | 5.00 | 40.0 | 10.00 | 1.2 | 20.4 | 19.2 |
| TPP20 | 20 | 140 | 5.00 | 40.0 | 10.00 | 3.2 | 20.9 | 17.7 |
| ACPH10 | 10 | 120 | 5.00 | 40.0 | 10.00 | 1.2 | 32.7 | 31.5 |
| ACPH20 | 20 | 140 | 5.00 | 40.0 | 10.00 | 1.3 | 17.8 | 16.5 |
| BB10 | 10 | 140 | 5.00 | 40.0 | 10.00 | 1.3 | 4.5 | 3.2 |
| BB20 | 20 | 95 | 5.00 | 40.0 | 10.00 | 1.2 | 4.7 | 3.5 |
| ATEC27 | 27 | | 5.00 | 40.0 | 10.00 | | 57.9 | 57.9 |
| TEC10 | 10 | 125 | 5.00 | 60.0 | 10.00 | 0.90 | 6.3 | 5.4 |
| TEC20 | 20 | 150 | 5.00 | 60.0 | 10.00 | 1.30 | 5.3 | 4.0 |
| NETS10 | 10 | 140 | 5.00 | 60.0 | 10.00 | 1.6 | 6.4 | 4.8 |
| NETS20 | 20 | 120 | 5.00 | 60.0 | 10.00 | 1.5 | 4.4 | 2.9 |
| DMS10 | 10 | | 5.00 | 60.0 | 10.00 | 0.7 | 4.1 | 3.4 |
| DMS30 | 30 | 140 | 5.00 | 60.0 | 10.00 | 0.9 | 4.2 | 3.3 |
| TPP10 | 10 | 280 | 5.00 | 60.0 | 10.00 | 1.2 | 24.9 | 23.7 |
| TPP20 | 20 | 140 | 5.00 | 60.0 | 10.00 | 3.2 | 22.8 | 19.6 |
| BB10 | 10 | 140 | 5.00 | 60.0 | 10.00 | 1.3 | 5.1 | 3.8 |
| BB20 | 20 | 95 | 5.00 | 60.0 | 10.00 | 1.2 | 4.3 | 3.1 |
| BB10 | 10 | 140 | 15.00 | 60.0 | 10.00 | 1.3 | 5.0 | 3.7 |
| BB20 | 20 | 95 | 15.00 | 60.0 | 10.00 | 1.2 | 4.6 | 3.4 |

As shown in Table 2, the combination of cellulose acetate and specific plasticizers yields products having superior haze properties, e.g., below 4.

Compatibility was tested by contacting a protective layer, e.g., polycarbonate, with plasticizers. In Example 13, a polycarbonate plaque was contacted with TCPP and was monitored over time. After 24 hours, the polycarbonate plaque demonstrated no noticeable effect, e.g., no polycarbonate degradation was observed.

In Comparative Example H, a similar polycarbonate plaque was contacted with DEP and monitored over time. After 4 hours, the polycarbonate plaque demonstrated noticeable discoloration and surface damage.

Thus, as shown in Table 2 and in the comparison of Example 14 and Comparative Example H, the combination of cellulose acetate and specific plasticizers yields products having superior haze properties, as well as little or few compatibility problems with polycarbonate-containing elements, e.g., connectors and/or films.

While the invention has been described in detail, modifications within the spirit and scope of the invention will be readily apparent to those of skill in the art. It should be understood that aspects of the invention and portions of various embodiments and various features recited herein and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only, and is not intended to limit the invention.

We claim:

1. A multi-layer anti-fog composition, comprising:
   an anti-fog layer comprising from 60 to 74 wt % cellulose acetate and from 5 to 40 wt % of a plasticizer comprising tris-chloropropyl phosphate, and having opposing major planar surfaces;
   a protective layer comprising polycarbonate having opposing major planar surfaces oriented substantially coplanar, at least in part, to the anti-fog layer forming a multi-layered anti-fog composition, the protective layer being configured to define an air gap between the anti-fog layer and the protective layer and; and
   a connector extending through the multi-layered anti-fog composition; wherein the connector has the same composition as the protective layer.

2. The anti-fog composition of claim 1, wherein the anti-fog layer has a fog time greater than 10 seconds, preferably greater than 20 second, more preferably greater than 30 seconds and/or a haze value ranging from 0.1% to 4.0%, as measured by ASTM D1003 (2016 or equivalent).

3. The anti-fog composition of claim 1, wherein the anti-fog layer has a fog time greater than 20 seconds, and a haze value ranging from 0.1% to 3.0%, as measured by ASTM D1003 (2016 or equivalent).

4. The anti-fog composition of claim 1, wherein the anti-fog layer has a fog time greater than 30 seconds, and a haze value ranging from 0.1% to 2.5%, as measured by ASTM D1003 (2016 or equivalent).

5. The anti-fog composition of claim 1, wherein the anti-fog layer comprises less than 5 wt % of plasticizers selected from the group consisting of (acetyl) triethyl citrate, triacetin, triphenyl phosphate, diethyl phthalate, glycerol tribenzoate, polyethylene glycol, dimethyl sebacate, acetophenone, benzyl benzoate, N-ethyl-toluene sulfonamide, dibutyl citrate, diisoctyl adipate, phthalate esters, polyol esters, and mixtures thereof.

6. The anti-fog composition of claim 1, wherein the anti-fog layer comprises substantially no cellulose acetate propionate and/or cellulose propionate.

7. The anti-fog composition of claim 1, wherein the anti-fog layer comprises substantially no diethyl phthalate.

8. The anti-fog composition of claim 1, wherein the composition does not comprise an adhesive layer between the anti-fog film and the protective film.

9. A multi-layer anti-fog composition, comprising:
   an anti-fog layer comprising from 60 to 74 wt % cellulose acetate from 5 to 40 wt. % of a plasticizer comprising tris-chloropropyl phosphate;
   a protective layer comprising polycarbonate oriented coplanar to the anti-fog layer, and spaced relative to the anti-fog layer to define an air gap therebetween, and
   a connector extending through the anti-fog layer and the protective layer and securing the orientation thereof, wherein the connector has the same composition as the protective layer;
     wherein the anti-fog layer has a fog time greater than 10 seconds, and a haze value ranging from 0.1% to 4.0%, as measured by ASTM D1003 (2016 or equivalent); and
     wherein the protective layer has a haze value ranging from 0.1% to 4.0%, as measured by ASTM D1003 (2016 or equivalent).

10. A process for producing a multi-layer anti-fog composition comprising an anti-fog layer, the process comprising the steps of:

(a) combining cellulose acetate and a plasticizer comprising tris-chloropropyl phosphate and solvent to form a dope;
(b) casting the dope to form a precursor layer;
(c) contacting the precursor film with a caustic solution to form a treated layer, preferably at a residence time ranging from 0.5 minutes to 20 minutes and/or at a temperature ranging from 40° C. to 100° C.;
(d) washing the treated layer to form a washed layer;
(e) drying the washed layer to form the anti-fog layer; and
(f) attaching to the anti-fog layer a protective layer comprising polycarbonate having opposing major planar surfaces using a connector to form a multi-layered structure,
wherein the anti-fog layer comprises from 60 to 74 wt % cellulose acetate and from 5 to 40 wt. % of a plasticizer comprising tris-chloropropyl phosphate;
wherein the protective layer is configured substantially coplanar, at least in part, to the anti-fog layer,
wherein the connector extends through the multi-layered structure and has the same composition as the protective layer, and
wherein the protective layer is spaced relative to the anti-fog layer to define an air gap therebetween.

11. A process for producing a multi-layer anti-fog composition comprising an anti-fog layer, the process comprising the steps of:
(a) extruding pellets comprising cellulose acetate and a plasticizer comprising tris-chloropropyl phosphate and optionally an antioxidant and/or a heat stabilizer, to form a precursor layer;
(b) contacting the precursor layer with a caustic solution to form a treated layer;
(c) washing the treated layer to form a washed layer;
(d) drying the washed layer to form the anti-fog layer; and
(e) attaching to the anti-fog layer a protective layer having opposing major planar surfaces using a connector to form a multi-layered structure,
wherein the anti-fog layer comprises from 60 to 74 wt % cellulose acetate and from 5 to 40 wt. % of a plasticizer comprising tris-chloropropyl phosphate;
wherein the protective layer comprises polycarbonate and is configured substantially coplanar, at least in part, to the anti-fog layer,
wherein the connector extends through the multi-layered structure and has the same composition as the protective layer, and
wherein the protective layer is spaced relative to the anti-fog layer to define an air gap therebetween.

12. The anti-fog composition of claim 1, wherein the anti-fog layer comprises from 65 to 74 wt % cellulose acetate and from 5 to 35 wt % plasticizer.

13. The process of claim 10, wherein the anti-fog layer comprises from 65 to 74 wt % cellulose acetate and from 5 to 35 wt % plasticizer.

14. The process of claim 11, wherein the anti-fog layer comprises from 65 to 74 wt % cellulose acetate and from 5 to 35 wt % plasticizer.

15. The anti-fog composition of claim 1, wherein the connector is a pin, nail, screw, or staple.

16. The anti-fog composition of claim 9, wherein the connector is a pin, nail, screw, or staple.

17. The process of claim 10, wherein the connector is a pin, nail, screw, or staple.

18. The process of claim 11, wherein the connector is a pin, nail, screw, or staple.

* * * * *